Patented Mar. 18, 1952

2,589,296

UNITED STATES PATENT OFFICE 2,589,296

2-TRIHALOMETHYL-1,3-DIOXOLANE-4-CARBOXYBENZOATE AND CARBOXYALKANOATE

Elmer F. Schroeder, Chicago, Ill., assignor to G. D. Searle & Co., Chicago, Ill., a corporation of Illinois No Drawing. Application June 2, 1950, Serial No. 165,878

8 Claims. (Cl. 260—338)

This invention relates to 1,3-dioxolane derivatives having in the 2-position a trihalomethyl group and in the 4-position a substituted methyl group, and to processes for the preparation thereof. In particular it relates to compounds having the general structural formula

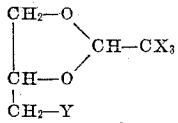

wherein X is a halogen and Y is an alkoxyl, nitrate, carboxybenzoate, or carboxyalkanoate group.

This application is a continuation-in-part of my copending application Serial No. 786,317, filed November 15, 1947, abandoned.

The substances to which this invention relates are generally useful as hypnotics and sedatives. They have the property of depressing the central nervous system and are therefore useful in pharmaceutical preparations. Certain of the compounds are effective both by parenteral and oral routes and others are active orally. Many of them are of value as disinfectants.

Compounds of this invention are readily prepared by condensing a suitable α,β-dihydroxy compound with chloral or bromal or hydrates thereof in the presence of dehydrating agents such as sulfuric acid or zinc chloride. During these reactions water is split out under the influence of the dehydrating agent and a heterocyclic dioxolane ring is formed. My compounds may also be prepared by treating a suitably substituted dioxolane such as one bearing in the 4-position a hydroxymethyl group with a nitrating or acylating agent, as for example nitric acid and aliphatic and aromatic dibasic acid halides and anhydrides.

In the general structural formula given hereinabove, X represents a halogen of atomic number greater than nine such as bromine or chlorine, Y represents a substituent such as alkoxyl, nitrate, carboxybenzoate or carboxyalkanoate. Among the alkoxyl groups which my invention contemplates are the lower alkoxyl radicals such as methoxyl, ethoxyl, propoxyl, isopropoxyl, butoxyl and the like. The term "carboxyalkanoate" as used herein and in the appended claims means an aliphatic acid radical or alkanoate radical bearing a carboxyl substituent. A carboxyalkanoate group can be represented by the formula HOOC—Alk—COO—, wherein Alk is an alkylene radical. The bivalent radical, Alk, is derived from a saturated aliphatic hydrocarbon by the removal of two hydrogen atoms. A carboxyalkanoate group is derived from a saturated aliphatic dibasic acid, anhydride or acid halide by reaction with a hydroxyl radical, such as the hydroxyl radical of a 4-hydroxymethyl-1,3-dioxolane. A carboxybenzoate group is represented by the formula HOOC—C$_6$H$_4$—COO—, wherein C$_6$H$_4$ represents a phenylene radical. It is derived from a dibasic acid of the benzene series, or halide or anhydride thereof. The free carboxyl radical of the carboxyalkanoate or carboxybenzoate group readily forms salts with organic and inorganic bases and the dioxolane compounds carrying such substituents are thereby soluble in dilute aqueous bases, forming clear solutions which are nearly neutral and which are stable over long periods of time. Among the carboxyalkanoate radicals which are within the scope of this invention are those derived from dibasic aliphatic acids such as malonic, succinic, glutaric, adipic and the like, as well as those derived from similar alkyl-substituted aliphatic dicarboxylic acids such as methylsuccinic, dimethylsuccinic, methyladipic, ethyladipic and related acids. The carboxybenzoate radicals are those derived from phthalic, terephthalic and isophthalic acids.

Salts of an acidic compound of the formula

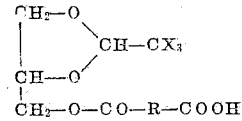

wherein X is a halogen and R is an alkylene or phenylene radical, can be prepared in a purified state by solution of said acidic substance in an alcoholic solution of a base, followed by precipitation of the desired salt by the addition of an alcohol-soluble solvent in which the salt is only slightly soluble. Among such solvents are ethers, hydrocarbons, halogenated hydrocarbons, and esters of lower fatty acids. Among the bases which can be used are sodium hydroxide, potassium hydroxide, sodium alkoxides, potassium alkoxides, methylamine, ammonia, diethylamine, propylamine, trimethylamine, diethanolamine, diethylaminoethanol, morpholine and related alcohol-soluble bases. Salts can also be obtained in dry, pure form by dissolving the acidic compound of the foregoing formula in alcohol or other water-miscible solvent and adding an equivalent of an aqueous or alcoholic solution of a base and evaporating the resulting solution to dryness, preferably under reduced pressure.

Bases which are suitable for this purpose include ammonia, aliphatic amines, low-molecular weight heterocyclic amines, alkalies and the like. The salts of the foregoing acids are therefore suitable for parenteral administration in aqueous solution. The substances wherein Y represents alkoxy and nitrate radicals are generally soluble in fats and oils and can be administered orally in such solutions or dispersions.

The substances of this invention exist as a pair of cis-trans isomers, each being a racemic mixture of optical isomers. Therefore each of the products may be resolved into two geometric isomers, and the latter into four optically active isomers.

When 2 - trichloromethyl - 4 - hydroxymethyl-1,3-dioxolane is oxidized to 2-trichloromethyl-1,3-dioxolane-4-carboxylic acid, two crystalline isomers are obtained (application of Elmer F. Schroeder, Serial No. 4,930, filed January 28, 1948, now U. S. Patent 2,532,340, dated December 5, 1950). The lower-melting form of this acid (melting point 78-79° centigrade) loses hydrogen chloride readily on heating and is therefore considered to be the cis isomer. The higher-melting form (M. P. 133-134° C.) is taken as the trans form. The 2-trichloromethyl-4-hydroxymethyl-1,3-dioxolane obtained by hydrolysis from the crystalline 2 - trichloromethyl - 1,3-dioxolane-4-carbinol acid succinate yields the higher-melting 2 - trichloromethyl - 1,3-dioxolane-4-carboxylic acid on oxidation with nitric acid, indicating that these compounds have the trans configuration.

The cis form can be represented as follows:

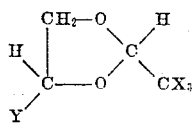

wherein X is halogen and Y is hydroxymethyl or carboxyl. The trans isomer can be shown as follows:

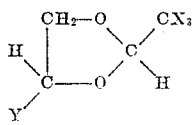

The cis-trans isomers have different physical properties and may be separated by means of their varying solubilities in organic solvents. The optical isomers have the same solubility properties and hence must be separated through their salts with optically active organic bases such as brucine and strychnine, as well as cinchonidine, cinchonine, hydroxyhydrindamine, menthylamine, morphine, α-phenylethylamine, phenyl oxynaphthyl methylamine, quinidine, quinine, and pseudo-ephedrine.

My invention is further disclosed by the following examples which are provided for the purpose of illustration and which are not intended in any way to limit this invention in spirit or in scope. The subject matter of Examples 1 and 2 is disclosed and claimed in my copending application, Serial No. 262,644, filed December 20, 1951.

Example 1

20 g. of 2-trichloromethyl-4-hydroxymethyl-1,3-dioxolane, 20 cc. of concentrated nitric acid and 20 cc. of water are mixed, warmed to about 60-65° C. and stirred until dissolved. The mixture is allowed to evaporate on a steam bath in an open vessel for 3 hours, then 60 cc. of water are added and the mixture is cooled. Crystals of 2 - trichloromethyl - 1,3-dioxolane-4-carbinol nitrate separate. These are removed by filtration and dried. After recrystallization from dilute alcohol the compound melts at 68-69° C. This compound has the formula

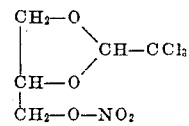

Example 2

70 g. of chloral hydrate are mixed with 225 cc. of concentrated sulfuric acid, stirred until liquefied, and cooled to 5° C. 40 g. of glycerol α-monoethyl ether are added at such a rate that the temperature remains between 5° and 15° C. with external chilling. After the addition, the reaction mixture is allowed to come slowly to room temperature with stirring. It is then poured on about 1200 g. of ice. The oily layer is separated and washed with water. It is taken up in chloroform, washed with water, dilute sodium carbonate, and again with water. The solution is dried and evaporated. The residue of 2-trichloromethyl-4-ethoxymethyl-1,3-dioxolane distills at 125-126° C. at 14 mm. pressure. This substance has the formula

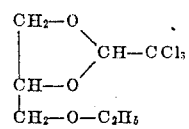

Example 3

400 g. of 2 - trichloromethyl-4-hydroxymethyl-1,3-dioxolane, 1000 cc. of pyridine and 200 g. of succinic anhydride are thoroughly mixed and heated to about 75° C. for 3 hours. After standing overnight the mixture is diluted with 100 parts of water. Most of the pyridine and water is removed under vacuum. One liter of water is added to the resulting syrup and a thick oil settles out. This is removed by decantation, and the oil is taken up in one liter of methylene chloride. This solution is washed with water, dried and evaporated under vacuum to remove solvent. 2-trichloromethyl - 1,3 - dioxolane-4-carbinol acid succinate so obtained is readily soluble in dilute sodium bicarbonate solution. An aqueous solution of the sodium salt is extracted with ether to remove organic materials and precipitated by the addition of an excess of 5 N hydrochloric acid. The succinate precipitates as a heavy syrup which can be purified by washing, by decantation and drying. This compound has the formula

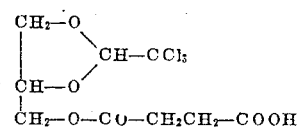

Example 4

A. 915 g. of the syrupy 2-trichloromethyl-1,3-dioxolane-4-carbinol acid succinate (Example 3), consisting of a mixture of cis and trans isomers, each a racemate, is dissolved in 915 cc. of hot toluene. To this are added 640 cc. of warm petroleum ether. The solution is cooled to room temperature. On scratching the side of the flask crystals of the trans isomer slowly separate. After the mixture has stood for about 3 days at room temperature, the crystals are collected on a filter and the filtrate, containing the cis isomer, is retained (part B). They are washed with a mixture of toluene and petroleum ether, then with petroleum ether. The crystalline isomer is recrystallized from a mixture of 3 parts of toluene and 1 part of petroleum ether. The trans form of 2-trichloromethyl - 1,3 - dioxolane-4-carbinol acid succinate forms colorless needles of M. P. 85–87° C. The crystals are only slightly soluble in water but dissolve readily in aqueous sodium bicarbonate solution, or other alkaline solutions, with the formation of a solution of the soluble sodium salt.

B. The filtrate from the crystals of the trans isomer is evaporated under reduced pressure, yielding a syrup consisting mainly of the cis isomer of 2-trichloromethyl - 1,3 - dioxolane-4-carbinol acid succinate.

Example 5

225 g. of trans - 2 - trichloromethyl-1,3-dioxolane-4-carbinol acid succinate are suspended in 500 cc. of water and treated gradually with stirring with a cooled solution of 70 g. of sodium hydroxide in 500 cc. of water. The solid dissolves rapidly and an oil then begins to separate. After two hours at room temperature the oil is separated, dissolved in 300 cc. of methylene chloride and washed well with water. The solution is dried with anhydrous sodium sulfate and then evaporated under reduced pressure. The residue of trans - 2 - trichloromethyl-4-hydroxymethyl-1,3-dioxolane distills at 103–104° C. at 1 mm. pressure.

Example 6

22 g. of trans - 2 - trichloromethyl-4-hydroxymethyl-1,3-dioxolane are dissolved in 50 cc. of anhydrous pyridine and treated with 14.8 g. of phthalic anhydride. The solution is heated for about two hours at 100° C., then cooled, treated with 5 cc. of water and finally distilled under reduced pressure to remove pyridine. The residue of trans - 2 - trichloromethyl-1,3-dioxolane-4-carbinol acid phthalate is taken up in chloroform, washed with dilute sulfuric acid and with water and dried over anhydrous sodium sulfate. The solvent is removed by evaporation and the residue slowly crystallizes. After recrystallization from petroleum ether trans - 2 - trichloromethyl-1,3-dioxolane-4-carbinol acid phthalate forms colorless crystals which melt at 93–95° C. This compound forms an insoluble salt with brucine, indicating that resolution of the trans form into its two optical isomers is possible. The isomers could then be hydrolyzed back to the two optically active isomers of trans - 2 - trichloromethyl-4-hydroxymethyl-1,3-dioxolane. The latter could be esterified with succinic anhydride, forming two optically active isomers of trans-2-trichloromethyl-1,3-dioxolane-4-carbinol acid succinate.

Example 7

10 g. of trans 2 - trichloromethyl-1,3-dioxolane-4-carbinol (Example 5) is covered with 20 cc. of concentrated nitric acid and warmed on a steam bath. After several minutes fumes of nitric oxide are evolved and a vigorous reaction sets in. The reaction mixture is removed from the steam bath and allowed to cool. The reaction is complete in about five minutes. Heavy crystals of trans-2-trichloromethyl - 1,3 - dioxolane - 4 - carboxylic acid precipitate. The reaction mixture is evaporated nearly to dryness, water being added from time to time until the nitric acid is expelled. The residue is taken up in dilute sodium bicarbonate solution, washed with methylene chloride, boiled to expel the organic solvent, cooled and acidified with concentrated hydrochloric acid. Crystals of trans - 2 - trichloromethyl-1,3-dioxolane-4-carboxylic acid separate. These are removed, washed with water, and dried. They melt at 134–135° C.

Example 8

A solution of 273 g. of 2-tribromomethyl-4-hydroxymethyl-1,3-dioxolane and 100 g. of succinic anhydride in 500 cc. of pyridine is kept at 70–80° C. for three hours. It is left overnight at room temperature and then diluted with 50 cc. of water. Most of the water and pyridine is evaporated under vacuum. The resulting syrup is diluted with 500 cc. of water and the oily precipitate is removed by decantation and dissolved in 500 cc. of methylene chloride. The resulting solution is washed thoroughly with water, dried with anhydrous sodium sulfate and evaporated under vacuum. The residue of 2-tribromomethyl-1,3-dioxolane-4-carbinol acid succinate is dissolved in dilute sodium bicarbonate solution, and the aqueous solution is washed with ether to remove organic impurities. The solution is then made acid and 2-tribromomethyl-1,3-dioxolane acid succinate precipitates as a heavy syrup. This is separated and dried. It has the formula

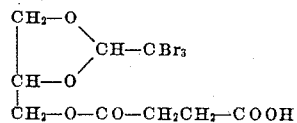

I claim:

1. A 1,3-dioxolane ester of the structural formula

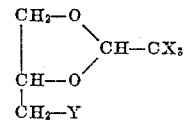

wherein X is a halogen of atomic number greater than 9 and Y is a member of the group consisting of carboxybenzoate and carboxyalkanoate groups.

2. A 1,3-dioxolane ester of the structural formula

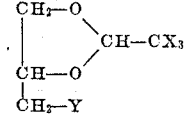

wherein X is a halogen of atomic weight greater than 9 and Y is a carboxyalkanoate radical, and salts thereof.

3. A 1,3-dioxolane ester of the structural formula

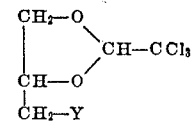

wherein Y is a carboxyalkanoate radical, and salts thereof.

4. A 1,3-dioxolane ester of the structural formula

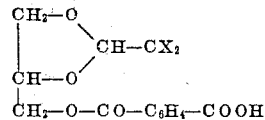

wherein X is a halogen of atomic number greater than 9, and salts thereof.

5. A 1,3-dioxolane ester of the structural formula

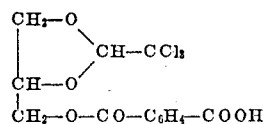

and salts thereof.

6. A 1,3-dioxolane ester of the structural formula

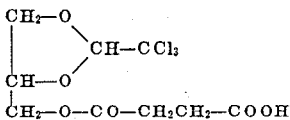

and salts thereof.

7. 2 - trichloromethyl - 1,3 - dioxolane - 4 - carbinol acid succinate, which has the structural formula

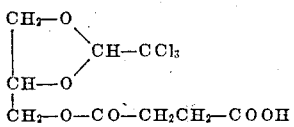

8. 2 - trichloromethyl - 1,3 - dioxolane - 4 - carbinol acid phthalate, which has the structural formula

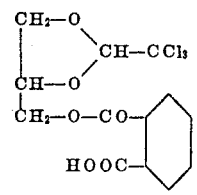

ELMER F. SCHROEDER.

REFERENCES CITED

The following references are of record in the file of this patent:

UNITED STATES PATENTS

| Number | Name | Date |
|---|---|---|
| 2,028,403 | Mares | Jan. 21, 1936 |
| 2,245,260 | Dickey | June 10, 1941 |
| 2,286,791 | Dickey | June 16, 1942 |